United States Patent [19]

Treybig

[11] Patent Number: 4,752,636

[45] Date of Patent: Jun. 21, 1988

[54] THERMOSETTABLE POLYMER OR PREPOLYMER PREPARED FROM HETEROCYCLIC MATERIALS CONTAINING NITROGEN ATOMS, CARBOXYLIC ACID MONO- OR DIANHYDRIDES AND A POLYMERIZABLE MATERIAL WITH ETHYLENICALLY UNSATURATED GROUPS AND CURED PRODUCTS THEREFROM

[75] Inventor: Duane S. Treybig, Lake Jackson, Tex.

[73] Assignee: The Dow Chemical Company, Midland, Mich.

[21] Appl. No.: 754,695

[22] Filed: Jul. 15, 1985

[51] Int. Cl.[4] .................... C08L 101/00; C08G 83/00
[52] U.S. Cl. ................................. 524/600; 524/606; 524/607; 525/419; 525/426; 528/322; 528/335; 528/341; 528/342
[58] Field of Search ............... 528/341, 342, 322, 335; 525/419, 426; 524/600, 606, 607

[56] References Cited

U.S. PATENT DOCUMENTS

| | | | |
|---|---|---|---|
| 3,424,718 | 1/1969 | Angelo | 260/47 |
| 3,528,950 | 9/1970 | Lubowitz | 260/78.4 |
| 3,562,223 | 2/1971 | Bargain et al. | 260/78 |
| 3,808,209 | 4/1974 | Donald | 260/250 R |
| 4,362,860 | 12/1982 | Ratto et al. | 528/248 |
| 4,471,107 | 9/1984 | Peake | 528/248 |

FOREIGN PATENT DOCUMENTS 42-14468  8/1967  Japan .

OTHER PUBLICATIONS

*New Commercial Polymers* 1969-1975 by Hans-Georg Elias, Gordon and Breach Science Publishers, New York, 1977, pp., 139-140.
"Nuclear Magnetic Resonance Study of Norbornene End-Capped Polyimides. 1. Polymerization of N—Phenylnadimine" by A. C. Wong and W. M. Ritchey, *Macromolecules,* 1981, vol. 14, pp. 825-831.
"Nuclear Magnetic Resonance Study of Norbornene End-Capped Polyimides. 2. Solution and Solid-State Carbon-13 Study of 2 NE/MDA and PMR Polymerization" by A. C. Wong , A. N. Garroway and W. M. Ritchey, *Macromolecules,* 1981, vol. 14, pp. 832-836.
Manly et al. in "A Study of the Chemistry of Pyrophthalone and Related Compounds" in *J. Org. Chem.,* 1958, vol. 23, pp. 373-380.
J. Ploquin et al. in "Heterocyclic β-Diketoenamines:1. 1,3-Indanediones Substituted at Position 2 with a Nitrogen Heterocycle", *J. Heterocyclic Chem.,* 1980, vol. 17, pp. 961-973.
J. Ploquin et al. in "Pyrophthalones II. Synthesis and Pharmacodynamic Acitvity of γ-Pyrophthalones. Effect of Substituents on the Pyridine Ring", *Eur. J. Med. Chem.,* 1974, vol. 9, pp. 519-525.
J. Ploquin et al. in "Reactivity of Methyl Groups During Condensation of 2,4-Lutidine and 2,4,6-Collidine with Phthalic Anhydride", *C. R. Acad. Sc. Paris,* Dec. 23, 1974, vol. 279, pp. 1149-1152.

*Primary Examiner*—Harold D. Anderson

[57] ABSTRACT

Thermosettable prepolymers are prepared by reacting (1) an aromatic heterocyclic material having one or more rings and at least one nitrogen atom and at least two reactive substituent groups which have at least one reactive hydrogen atom attached to a carbon atom which is attached to a heterocyclic ring such as 2,3,5,6-tetramethylpyrazine or 2,4,6-trimethylpyridine, (2) a cycloaliphatic or aromatic carboxylic acid cyclic mono- or dianhydride such as pyromellitic dianhydride and (3) a material containing a polymerizable ethylenically unsaturated group and at least one group selected from (a) a heterocyclic material having one or more rings and at least one nitrogen atom and at least one substituent group which has at least one reactive hydrogen atom attached to a carbon atom which is attached to a heterocyclic ring such as 2-methyl-5-vinylpyridine, and (b) a cycloaliphatic or aromatic carboxylic acid cyclic monoanhydride or dianhydride such as cis-5-norbornene-endo-2,3-dicarboxylic anhydride. These prepolymers can be cured or thermosetted by heat and pressure or they can be cured by reaction with a N,N'-bis-imide.

14 Claims, No Drawings

THERMOSETTABLE POLYMER OR PREPOLYMER PREPARED FROM HETEROCYCLIC MATERIALS CONTAINING NITROGEN ATOMS, CARBOXYLIC ACID MONO- OR DIANHYDRIDES AND A POLYMERIZABLE MATERIAL WITH ETHYLENICALLY UNSATURATED GROUPS AND CURED PRODUCTS THEREFROM

BACKGROUND OF THE INVENTION

The present invention pertains to the preparation of thermosettable ethenyl (vinyl) terminated polymers or prepolymers.

Japanese Patent No. Sho 42[1967]-14468 discloses that the reaction product of pyridine having methyl substituents with pyromellitic dianhydride produced a polymer having a melting point above 300° C. Copending application Ser. No. 754,699, filed July 15, 1985, discloses that the reaction product of pyrazine having alkyl substituents with mono- or dianhydrides produced a polymer having a melting point at, below and above 300° C. Both polymers are cured by a condensation reaction which generates water. This water vaporizes during cure and produces undesirable voids and/or surface imperfections in the composite or other cured article.

It has now been discovered that these undesirable characteristics of the cured articles can be reduced or eliminated by employing the thermosettable polymers of the present invention. These ethenyl terminated prepolymers of the present invention can be cured by an addition reaction via the unsaturated terminal groups, thereby eliminating the release of water vapor and resulting in composites or other cured articles which do not possess surface imperfections. Cured ethenyl terminated prepolymers prepared by reacting 2,3,5,6-tetramethylpyrazine, pyromellitic dianhydride and a material containing a polymerizable ethylenically unsaturated group provides 16–18% higher char yield in nitrogen at 950° C. than prepolymers prepared by reacting 2,3,5,6-tetramethylpyrazine with a mono- or dianhydride. Char yield is defined herein as the percent by weight of the polymer remaining after exposure to 950° C. during a thermogravimetric analysis of the polymer in a nitrogen atmosphere.

The ethenyl terminated prepolymers of the present invention are also suitable as novel comonomers for reaction with N,N-bis-imide resins. The copolymerization of the ethenyl terminated prepolymers with N,N-bis-imide resins occurs at a lower cure temperature than that of a N,N'-bis-imide resin alone, which results in energy conservation. Since the copolymerization is an addition reaction, volatile generation is minimized.

SUMMARY OF THE INVENTION

One aspect of the present invention pertains to thermosettable polymers or prepolymers prepared by reacting (A) at least one aromatic heterocyclic material having one or more rings and at least one nitrogen atom and at least two reactive substituent groups which have at least one reactive hydrogen atom attached to a carbon atom which is attached to a heterocyclic ring;

(B) at least one cycloaliphatic or aromatic carboxylic acid cyclic mono- or dianhydride; and (C) at least one material containing a polymerizable ethylenically unsaturated group and at least one group selected from
  (a) at least one aromatic heterocyclic material having one or more rings and at least one nitrogen atom and at least one reactive substituent group which has at least one reactive hydrogen atom attached to a carbon atom which is attached to the heterocyclic ring;
  (b) at least one cycloaliphatic or aromatic carboxylic acid cyclic anhydride group;
  (c) a combination of any of such groups; and wherein the components are employed in a molar ratio of (A):(B):(C) of from about 1:0.25:0.25 to about 1:4:4, preferably from about 1:0.5:0.5 to about 1:1.5:1.5, respectively.

Another aspect of the present invention pertains to the cured or thermoset product resulting from curing or thermosetting the above polymers or prepolymers by heat and pressure or by either homopolymerization in the presence of at least one N,N'-bis-imide or copolymerization with at least one N,N-bis-imide.

DETAILED DESCRIPTION OF THE INVENTION

Suitable heterocyclic materials having one or more rings and at least one nitrogen atom and at least two reactive substituent groups which have at least one reactive hydrogen atom attached to a carbon atom which is attached to a ring which can be employed herein include, for example, pyrazines, pyridines, pyrazoles, imidazoles, pyridazines, pyrimidines, purines, pteridines, triazines, quinolines and quinoxalines. Particularly suitable such substituent groups include methyl, —CH(R)$_2$ or —CH$_2$R groups wherein each R is independently a hydrocarbon group containing from 1 to about 20, preferably from 1 to about 10 carbon atoms.

In order for the hydrogen atom of the substituent group which hydrogen atom is attached to a carbon atom attached to a ring to be reactive, the substituent group must be either ortho or para with respect to a nitrogen atom. In the instance of substituted pyrazines, all of the substituent groups attached to a ring carbon atom are ortho with respect to a nitrogen atom.

Particularly suitable as the heterocyclic material which can be employed herein include the pyrazines such as, for example, 2,5-dimethylpyrazine, 2,6-dimethylpyrazine, 2,3,5-trimethylpyrazine, 2,3,5,6-tetramethylpyrazine, 2,5-dimethyl-3,6-pyrazinediamine, 2,3,5-trimethyl-6-nitropyrazine, 5-ethyl-2,6-dimethylpyrazine, 2,5-dimethyl-3-propylpyrazine, 3-chloro-2,5,6-trimethylpyrazine, 3-chloro-2,5-dimethylpyrazine, 2-ethyl-5-methylpyrazine, 2,5-diethylpyrazine, 2-ethyl-3,5-dimethylpyrazine, 2-ethyl-3,6-dimethylpyrazine, 5-methyl-2-propylpyrazine, 3,5-dimethyl-2-propylpyrazine, 2-butyl-3,5-dimethylpyrazine, 2-butyl-3,6-dimethylpyrazine, 2-butyl-5-ethylpyrazine, 2,5-dimethyl-3,6-bis(2-methylpropyl)pyrazine, 2,6-diethyl-3,5-dimethylpyrazine, 2,5-diethyl-3,6-dimethylpyrazine, 2,5-dimethyl-3,6-bis(1-methylethyl)pyrazine, and 2,3,5-trimethyl-6-(2-methylpropyl)pyrazine, mixtures thereof and the like. 2-Methylpyrazine can be mixed or blended with pyrazine having two or more reactive methyl substituents to control the molecular weight of the prepolymer.

Particularly suitable pyridines which can be employed herein include, for example, 2,6-dimethylpyridine, 2,4-dimethylpyridine, 2,3,4-trimethylpyridine, 2,3,6-trimethylpyridine, 2,4,5-trimethylpyridine, 2- ethyl-3,6-dimethylpyridine, 4-ethyl-2,6-dimethylpyridine, 2,6-diethylpyridine, 2,3-dimethyl-6-(1-methylethyl)pyridine, 3,6-dimethyl-2-(1-methylethyl)pyridine, 2-methyl-6-propylpyridine, 2,5-dimethyl-6-propylpyridine, 3-ethyl-2,5,6-trimethylpyridine, 2,3,4,5-tetramethylpyridine, 2,3,4,6-tetramethylpyridine, 2,3,5,6-tetramethylpyridine, pentamethylpyridine, 2,6-dimethyl-3-pyridinamine, 3-chloro-2,6-dimethylpyridine, mixtures thereof and the like. Pyridines having only one substituent group which has an active hydrogen atom attached to a carbon atom which is attached to the heterocyclic ring such as, for example, 2-methylpyridine, 4-methylpyridine, 2-ethylpyridine, 2-propylpyridine, 2-methylpyridine and the like can be mixed or blended with pyridine having two or more alkyl groups to control the molecular weight of the prepolymer.

Other suitable aromatic nitrogen containing heterocycles which can be employed herein include, pyrazoles, imidazoles, pyridazines, pyrimidines, purines, pteridines, triazines, quinolines and quinoxalines having two or more substituents having a reactive hydrogen atom attached to a carbon atom which is attached to a heterocyclic ring. Such substituent groups include methyl, —CH(R)$_2$ or —CH$_2$R wherein R$^2$ is as above defined.

Suitable pyrazoles include 3,5-dimethylpyrazole, 1-ethyl-3,5-dimethylpyrazole, 3,4,5-trimethylpyrazole, 3,5-diethylpyrazole, mixtures thereof and the like.

Suitable imidazoles which can be employed herein include 1,2-dimethylimidazole, 2,5-dimethylimidazole, 2,4-dimethylimidazole, 2,4,5-trimethylimidazole, 3-ethyl-4-methylimidazole, mixtures thereof and the like.

Suitable pyridazines include 3,5-dimethylpyridazine, 4-chloro-3,5-dimethylpyridazine, 3,4,5-trimethylpyridazine, 3,4,6-tripropylpyridazine, mixtures thereof and the like.

Suitable pyrimidines include 2,4-dimethylpyrimidine, 4,6-dimethylpyrimidine, 2,6-dimethyl-4-pyridinamine, 6-hydroxy-2,4-dimethylpyrimidine, 2,5-dihydroxy-4,6-dimethylpyrimidine, 4,6-dimethylpyrimidin-2-yl mercapto acetic acid, 2,4,6-trimethylpyrimidine, 2,4,6-tripropylpyrimidine, mixtures thereof and the like.

Suitable purines which can be employed herein include, for example, 2,8-dimethylpurine, 2,8-dimethyl-6-purinamine, 2,6,8-trimethylpurine, mixtures thereof and the like.

Suitable pteridines include 6,7-dimethylpteridine, 2,6-dimethylpteridine, 2,4,7-trimethylpteridine, 2,4,6,7-tetramethylpteridine, mixtures thereof and the like.

Suitable triazines which can be employed herein include 3,5-dimethyl-1,2,4-triazine, 3,6-dimethyl-1,2,4-triazine, 3,5,6-trimethyl-1,2,4-triazine, 2,4-di-methyl-1,3,5-triazine, 2,6-dimethyl-1,3,5-triazine, 2,4,6-trimethyl-1,3,5-triazine, mixtures thereof and the like.

Suitable quinolines include 2,4-dimethylquinoline, 2,4,6-trimethylquinoline, 2,4,6,7-tetramethylquinoline, mixtures thereof and the like.

Suitable quinoxalines include 2,3-dimethylquinoxaline, 2,3,7-trimethylquinoxaline, 2,3,6,8-tetramethylquinoxaline, mixtures thereof and the like.

Molecular weight control of the polymer can be obtained by the addition of an aromatic nitrogen containing heterocyclic material having one substituent group which has at least one reactive hydrogen atom attached to a carbon atom which is attached to the heterocyclic ring as a chain terminator to an aromatic nitrogen containing heterocyclic material having two or more reactive substituent groups which have at least one reactive hydrogen atom attached to a carbon atom which is attached to the heterocyclic ring. As an example, pyrazoles, pyridines, imidazoles, pyridazines, pyrimidines, purines, pteridines, triazines, quinolines or quinoxalines having one substituent group which has at least one reactive hydrogen atom attached to a carbon atom which is attached to the heterocyclic ring can be mixed with an aromatic heterocycle containing one or more nitrogens having two or more reactive substituent groups which have at least one reactive hydrogen atom attached to a carbon atom which is attached to the heterocyclic ring.

Suitable dicarboxylic acid monoahydrides which can be employed herein include, for example, those represented by the formula

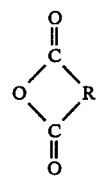

wherein R is a divalent radical such as, for example,

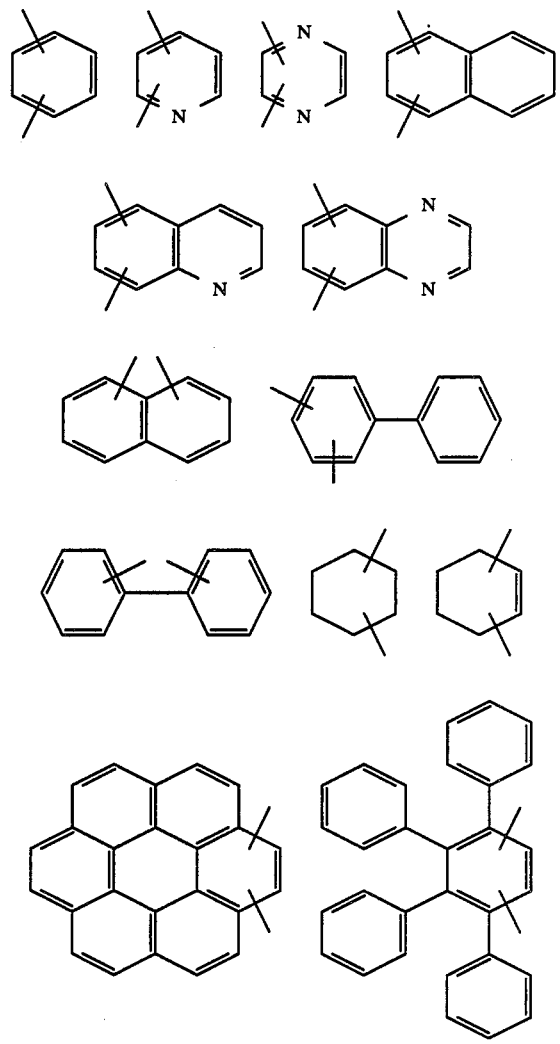

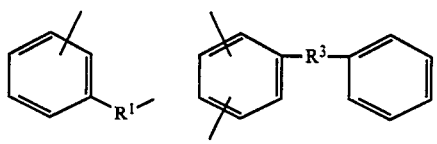

wherein $R^1$ is alkyl, or one of the following:

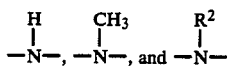

wherein $R^2$ is alkyl, aryl or aralkyl, or such groups containing substituents such as, for example, halogen, nitro or amino and where $R^3$ is alkylene, oxygen, sulfur, oxyalkylene, polyoxyalkylene, or one of the following:

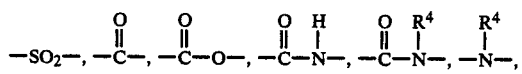

wherein $R^4$ and $R^5$ are alkyl, aryl or such groups containing substituents such as, for example, halogen, nitro or amino.

The preferred monoanhydrides are those in which the carbon atoms of the pair of carbonyl groups are directly attached to ortho carbon atoms in the R group to provide a 5-member ring such as, for example,

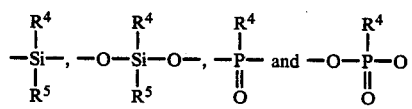

Suitable such monoanhydrides include, for example, phthalic anhydride, 3-nitrophthalic anhydride, tetraphenylphthalic anhydride, tetrachlorophthalic anhydride, tetrabromophthalic anhydride, hexahydro-4-methylphthalic anhydride, pyrazine-2,3-dicarboxylic anhydride, pyridine-2,3-dicarboxylic anhydride, quinoxaline-2,3-dicarboxylic anhydride, 2-phenylglutaric anhydride, isatoic anhydride, N-methyl isatoic anhydride, 5-chloroisatoic anhydride, 5-nitroisatoic anhydride, diphenic anhydride, 1,8-naphthalic anhydride, 4-chloro-1,8-naphthalic anhydride, 3-nitro-1,8-naphthalic anhydride, 3,4-coronenedicarboxylic anhydride, trans-1,2-cyclohexaneanhydride, 3,3-tetramethyleneglutaric anhydride, di-camphoric anhydride, mixtures thereof and the like.

Suitable tetracarboxylic acid dianhydrides which can be employed herein include, for example, those represented by the formula

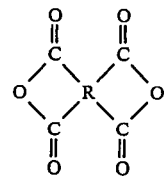

wherein R is a tetravalent aromatic radical such as, for example:

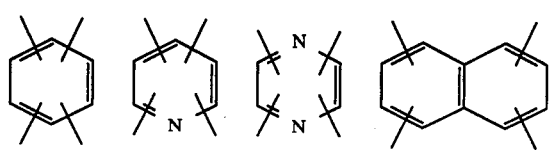
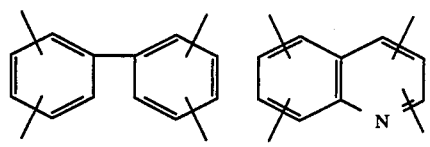
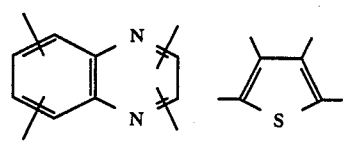
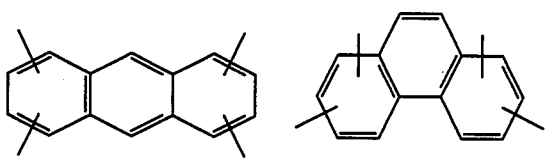
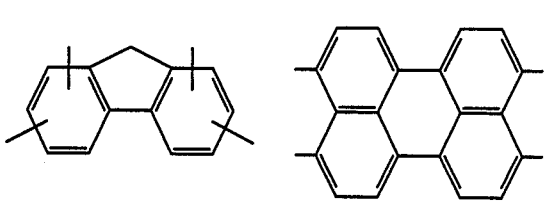
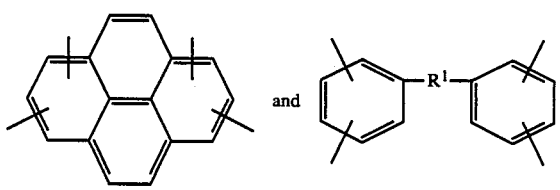
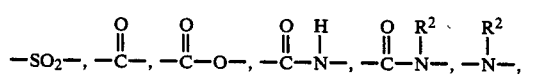

wherein $R^1$ is alkylene, oxygen, sulfur, oxyalkylene, polyoxyalkylene, or one of the following:

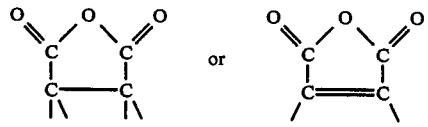
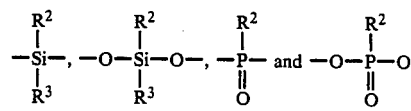

wherein $R^2$ and $R^3$ are alkyl, aryl or aralkyl, or such groups containing substituents such as, for example, halogen, nitro or amino.

Suitable such dianhydrides include, for example, pyromellitic dianhydride, benzene-1,2,3,4-tetracarboxylic dianhydride, pyridine-2,3,5,6-tetracarboxylic dianhydride, pyrazine-2,3,5,6-tetracarboxylic dianhydride, naphthalene-2,3,6,7-tetracarboxylic dianhydride, naphthalene-1,4,5,8-tetracarboxylic dianhydride, naphthalene-1,2,4,5-tetracarboxylic dianhydride, 2,6-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, 3,4,9,10-perylenetetracarboxylic dianhydride, thiophene-2,3,4,5-tetracarboxylic dianhydride, bis(3,4-dicarboxyphenyl)sulfone dianhydride, 2,3,2′,3′-benzophenonetetracarboxylic dianhydride, 2,3,3′,4′-benzophenonetetracarboxylic dianhydride, bis(2,3-dicarboxyphenyl)methane dianhydride, bis(3,4-dicarboxyphenyl)methane dianhydride, 1,1-bis(3,4-dicarboxyphenyl)ethane dianhydride, 2,2-bis(2,3-dicarboxyphenyl)propane dianhydride, bis(3,4-dicarboxyphenyl)ether dianhydride, anthracene-2,3,6,7-tetracarboxylic dianhydride, fluorene-2,3,6,7-tetracarboxylic dianhydride, pyrene-1,2,7,8-tetracarboxylic dianhydride, quinoxaline-2,3,6,7-tetracarboxylic dianhydride, phenazine-2,3,7,8-tetracarboxylic dianhydride, 1,1-bis(2,3-dicarboxy-5-oxyphenyl)ethane dianhydride, mixtures thereof and the like.

Tetracarboxylic acid dianhydrides can be mixed or blended with cycloaliphatic or aromatic monoanhydrides or mixtures of monoanhydrides which serve as chain terminators to control molecular weight of the polymers.

Ethenyl (vinyl) termination agents or compounds containing at least one polymerizable unsaturated group include (a) ethenyl substituted aromatic nitrogen heterocyclic compounds having one or more rings and at least one substituent group which has at least one hydrogen atom attached to a carbon atom which is attached to a heterocyclic ring and (b) a cycloaliphatic or aromatic carboxylic acid anhydride having at least one polymerizable unsaturated group. Suitable ethenyl substituted aromatic nitrogen heterocyclic compounds having at least one or more reactive substituent group which has at least one hydrogen atom attached to a carbon atom which is attached to the heterocyclic ring include 3-ethenyl-2-methylpyridine (2-methyl-3-vinylpyridine); 5-ethenyl-2-methylpyridine (2-methyl-5-vinylpyridine); 6-ethenyl-2-methylpyridine (2-methyl-6-vinylpyridine); 2-(but-1,3-dienyl)-6-methylpyridine; 6-methyl-2-(pent-1-enyl)pyridine; 2-(but-1,3-dienyl)-4,6-dimethylpyridine; 2-methyl-4(prop-1-enyl)pyridine; 2-(6-(4-(1-methylethen-1-yl)cyclohex-1-enyl))-6-methylpyridine; 2-(6-(4-(1-methylethen-1-yl)cyclohex-1-enyl))-4,6-dimethylpyridine; 3,5-diethenyl-2-methylpyridine; 2,5-diethenyl-3,4-dimethylpyridine; 3,5-diethenyl-2,4,6-trimethylpyridine; 3-chloro-5-ethenyl-2,6-dimethylpyridine; 5-ethenyl-6-ethyl-2-methylpyridine; 5-ethenyl-2-methyl-4-propylpyridine; 3-ethenyl-2,6-diethylpyridine; 6-ethenyl-2,4-diethylpyridine; 3-ethenyl-2-methylpyrazine (2-methyl-3-vinylpyrazine); 5-ethenyl-2-methylpyrazine (2-methyl-5-vinylpyrazine); 6-ethenyl-2-methylpyrazine (2-methyl-6-vinylpyrazine); 5-ethenyl-2,6-dimethylpyrazine; 5-ethenyl-2,3,6-trimethylpyrazine; 3,5-diethenyl-2,6-dimethylpyrazine; 5-ethenyl-2-ethyl-6-methylpyrazine; 5-ethenyl-2,6-diethylpyrazine; 2-methyl-5-(1-methylethenyl)-pyrazine; 2,5-dimethyl-3-nitropyrazine; 2-(2-ethylbut-1-enyl)-6-methylpyrazine; 2-methyl-6-(2-methylprop-1-enyl)pyrazine; 2-(but-1,3-dienyl)-6-methylpyrazine; 3,6-diethyl-2-(pent-1-enyl)pyrazine; 2-(but-1,3-dienyl)-3,6-dimethylpyrazine; 2-methyl-5-(prop-1-enyl)pyrazine; 2-(6-(4-(1-methylethen-1-yl)cyclohex-1-enyl))-6-methylpyrazine; 2-(6-(4-(1-methylethen-1-yl)-cyclohex-1-enyl))-5,6-dimethylpyrazine; 2-(6-(4-(1-methylethen-1-yl)cyclohex-1-enyl))-3,5,6-trimethylpyrazine; 5-ethenyl-3-methylpyridazine; 4-chloro-5-ethenyl-3-methylpyridazine; 5-ethenyl-3,6-dimethylpyridazine; 4-ethenyl-2,6-dimethylpyrimidine; 6-ethenyl-2-methyl-4-pyrimidinamine; 6-ethenyl-2,8-dimethylpurine; 8-ethenyl-2,6-dimethylpurine; 6-ethenyl-8-ethyl-2-methylpurine; 6-ethenyl-2-methyl-8purinamine; 2-ethenyl-6,7-dimethylpteridine; 6-ethenyl-2,4-dimethyl-1,3,5-triazine; 5-ethenyl-3,6-dimethyl-1,2,4-triazine; 5-ethenyl-3-methyl-6-propyl-1,2,4-triazine; 7-ethenyl-2,4,8-trimethylquinoline; 6,7-diethenyl-2,4,8-trimethylquinoline; 6-ethenyl-2,3,8-trimethylquinoxaline; 4-ethenyl-2,5-dimethylimidazole; 4-ethenyl-3,5-dimethylpyrazole and their mixtures.

Suitable cycloaliphatic or aromatic carboxylic acid cyclic monoanhydrides having at least one polymerizable unsaturated group are represented by the formula:

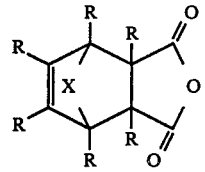

in which R is a hydrogen, halogen or a 1 to 4 carbon alkyl group and X is either $-CH_2-$, $-CH_2CH_2-$, $-O-$, $-NH-$, $-CCl_2-$, or $-S-$. Preferred cyclic or aromatic carboxylic acid anhydrides having at least one polymerizable unsaturated group include 3,6-endomethylene-1,2,3,6-tetrahydrophthalic anhydride (cis-5-norbornene-endo-2,3-dicarboxylic anhydride), endo-bicyclo[2.2.2.]octa-5-ene-2,3-dicarboxylic anhydride, 3,6-endoxo-1,2,3,6-tetrahydrophthalic anhydride (7-oxa-bicyclo[2.2.1.]hept-5-ene-2,3-dicarboxylic anhydride), 1,4,5,6,7,7-hexachloro-5-norbornene-2,3-dicarboxylic anhydride, mixtures thereof and the like. Other cyclic or aromatic carboxylic anhydrides include cis-1,2,3,6-tetrahydrophthalic anhydride (cis-4-cyclohexane-1,2-dicarboxylic anhydride), citraconic anhydride, 2,3-dimethylmaleic anhydride, dichloromaleic anhydride, mixtures thereof and the like.

The ethenyl terminated prepolymers can be prepared by condensing the alkyl substituted nitrogen aromatic heterocyclic material, carboxylic acid mono- or dianhydride, and compound containing at least one polymerizable unsaturated group in a one or two step process. The one step process comprises condensing all three ingredients simultaneously. The two step process comprises (1) condensing the alkyl substituted nitrogen heterocyclic material and carboxylic acid mono- or dianhydride to form a prepolymer and then (2) condensing the prepolymer with a compound or compounds containing at least one polymerizable unsaturated group. These reactions can be carried out neat or in the presence of a solvent. A solvent is preferred. Dehydration conditions are suitably provided by a dehydrating agent and/or a catalyst to activate the methyl groups. In the condensation steps without a ethenyl termination agent, condensation is carried out at a temperature of from about 50° to about 250° C., preferably from 120° to 200° C. for about 10 minutes to 128 hours (600 s to 460,800 s), especially 30 minutes to 64 hours (1800 s to 230,400 s). In the condensation steps with a ethenyl termination agent, condensation is carried out at a temperature of from 50° to about 140° C., preferably from 80° to 120° C. for about 1 to 64 hours (3600 s to 230,400 s), preferably from 6 to 24 hours (21,600 s to 86,400 s).

Suitable solvents include ketones, ethers, amides, acids, aromatic heterocycles containing no reactive substituent groups which have at least one reactive hydrogen atom attached to a carbon atom which is attached to the heterocyclic ring, chlorinated solvents and the like. Particularly suitable solvents include, tetrahydrofuran, pyridine, glacial acetic acid, dimethylformamide, N,N-dimethylacetamide, N,N-diethylformamide, N,N-dimethylmethoxyacetamide, hexamethylphosphotriamide, N-methyl-pyrrolidinone, mixtures thereof and the like.

Suitable catalysts include, for example, acids, Lewis acids, bases or salts. Particularly suitable acids include, for example, sulfuric, hydrochloric, acetic or p-toluenesulfonic acid. Particularly suitable Lewis acids include boron trifluoride. Particularly suitable bases include, for example, hydroxides of alkali or alkaline earth metals or of quaternary ammonium. Particularly suitable salts include, for example, zinc chloride or aluminum chloride. The use of such catalysts is not indispensable but it reduces the time required for the reaction. The amount is e.g. of from about 0.1 to about 10 mole % with respect to the cycloaliphatic or aromatic carboxylic acid mono or dianhydride. If desirable, larger or lesser quantities can be employed.

The reaction can also be accelerated by certain substances such as methyl iodide, methyl sulfate, benzyl chloride etc., capable of forming with the pyrazinic base quaternary ammonium derivatives, such substances being usable in catalytic amounts or higher proportions.

Dehydrating agents such as acetic anhydride, trifluoroacetic anhydride, propionic anhydride and the like can promote the reactions and its action can be sufficient to render superfluous the incorporation of a catalyst. The amount of anhydride used ranges from 1 to 10 moles per mole of vinyl termination agent, preferably 1.1 to 5. The preferred dehydrating medium is a mixture of glacial acetic acid and acetic anhydride. The acetic acid and acetic anhydride can be removed by distillation, solvent extraction or solvent fractionation. Examples of several solvent fractionation methods are described in U.S. Pat. Nos. 4,362,860 and 4,471,107 which are incorporated herein by reference.

The reaction is usually conducted either under reduced pressure or in an inert atmosphere such as, for example, nitrogen, helium, neon, xenon, argon, mixtures thereof and the like.

Volatile emission during cure can be limited by subjecting the thermosettable prepolymers or resins of the present invention to sublimation, distillation or solvent extraction to remove reactants, catalyst and solvents. Suitable solvents for extraction include, for example, alcohols, acetonitrile, ethers, hydrocarbons, chlorinated solvents and the like. Particularly suitable solvents include acetonitrile, methanol, ethanol, mixtures thereof and the like.

The thermosettable prepolymers or resins of the present invention can be cured as is with the application of heat and pressure, or they can be dissolved in a suitable solvent or mixture of solvents and employed to saturate various reinforcing materials so as to prepare composites therefrom through the application of heat and pressure.

Suitable solvents which can be employed to saturate the various reinforcing materials include, for example, ketones, acetates, alcohols, ethers, hydrocarbons and the like. Particularly suitable solvents include, for example, acetone, methylethylketone, ethyl acetate, methylene chloride, trichloroethylene, tetrahydrofuran, chlorobenzene, ethanol, n-propanol, N-methyl-pyrrolidone, dimethylformamide, dimethylacetamide, nitrobenzene, mixtures thereof and the like.

Suitable reinforcing materials include, for example, glass fibers, polyamide fiber, carbon or graphite fibers and the like in any form such as, for example, matt, woven or fibrous form. Any synthetic or natural fiber material can be employed as the reinforcing material.

The thermosettable prepolymers can be used according to various conventional techniques applicable to thermosetting resins. Powdered prepolymers are especially adapted for shaping by pressure-molding, but they can also be dissolved in a solvent or be employed in molten form. They can be used in the preparation of laminates or composites, films, coatings and the like.

The prepolymer is advantageously set by a thermal treatment at a temperature of from about 100° to about 300° C. If desired, the prepolymer can be compression molded at temperatures up to about 100,000 psig (689 MPa). Said polymer has a good thermal stability.

The vinyl terminated prepolymer can be either homopolymerized (blended) in the presence of a N,N'-bis-imide or copolymerized with a N,N'-bis-imide of the formula:

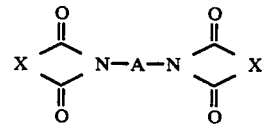

in which X represents a divalent radical containing a carbon-carbon double bond and A is a divalent radical having at least 2 carbon atoms. Preferred N,N'-bis-imides which may be employed, are 1,1'-(1,2-ethanediyl)bis-1H-pyrrole-2,5-dione; 1,1'-(1,6-hexanediyl)bis-1H-pyrrole-2,5-dione; 1,1'-(1,4-phenylene)-bis-1H-pyrrole-2,5-dione; 1,1'-(1,3-phenylene)bis-1H-pyrrole-2,5-dione; 1,1'-(methylenedi-4,1-phenylene)bis-1H-pyrrole-2,5-dione, [1,1'-(methylenedi-4,1-phenylene)bismaleimide]; 1,1'-(oxydi-4,1-phenylene)bis-1H-pyrrole-2,5-dione; 1,1'-(sulfonyldi-4,1-phenylene)-bis-1H-pyrrole-2,5-dione; 1,1'-(methylenedi-4,1-cyclohexanediyl)bis-1H-pyrrole-2,5-dione; 1,1'-[1,4-phenylenebis(methylene)]bis-1H-pyrrole-2,5-dione; 1,1'-(1,1-dimethyl-3-methylene-1,3-propanediyl)di-4,1-phenylene]bis-1H-pyrrole-2,5-dione; 1,1'-[(1,3,3-trimethyl-1-propene-1,3-diyl)di-4,1-phenylene]bis-1H-pyrrole-2,5-dione; and Technochemie's H-795 and M-751 resins. Technochemie's H-795 resin is represented by the formula:

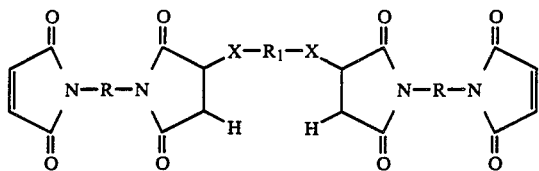

where R is an aromatic ring and X—R₁—X is a Michael addition coupling group. Technochemie's M-751 resin is a "eutectic" mixture of

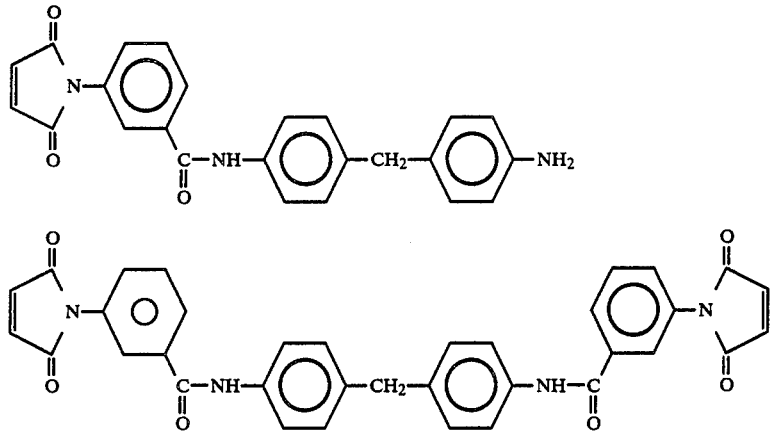

Many of these and other suitable N,N'-bis-imides which can be employed herein are disclosed in U.S. Pat. No. 3,562,223 which is incorporated herein by reference.

The following examples are illustrative of the invention, but are not to be construed as to limiting the scope thereof in any manner.

EXAMPLE 1

2,3,5,6-Tetramethylpyrazine (92.6 g, 0.68 mole), pyromellitic dianhydride (221.7 g, 1.02 moles), and acetic acid (123.1 g, 2.05 moles) were weighed into a 2 liter resin kettle equipped with an immersion thermometer, mechanical stirrer, nitrogen gas purge and condenser. After the reactants were stirred and deoxygenated for five minutes (300 s), acetic anhydride (214.8 g, 2.1 moles) was added to the resin kettle. The reactants were heated to 134° C. and allowed to reflux for 1 hour 5 minutes (3900 s). The reaction mixture was cooled to 95° C. and 2-methyl-5-vinylpyridine (81.8 g, 0.69 mole) was added to the resin kettle. The reactor contents were heated between 118°–123° C. for an additional 9 hours 54 minutes (35,640 s) and then cooled to room temperature to give a brown colored liquid. The brown colored liquid was rotary evaporated under full vacuum at 100° C. for 2 hours (7200 s) to give a viscous brown liquid. The viscous brown liquid was dried under full vacuum between 92°–135° C. for 50 minutes (3000 s), cooled to room temperature and crushed with mortar and pestle to give a brown powder. The brown powder was dried under full vacuum between 80°–127° C. for 2 hours 25 minutes (8700 s). This dried brown powder softened between 214°–232° C.

EXAMPLE 2

The brown powder prepared in Example 1 was dried under full vacuum between 82°–129° C. for 9 hours 37 minutes (34,620 s). This dried brown powder (50.4 g) and acetonitrile (205.4 g) were stirred in a 500 ml resin kettle at room temperature for 3 hours 23 minutes (12,180 s). The acetonitrile was removed by vacuum filtration. The brown powder was washed several times with acetonitrile and then dried under full vacuum between 90°–157° C. for 2 hours 15 minutes (4050 s). The resulting brown powder softened between 235°–239° C. and melted between 273°–283° C. The brown prepolymer was compression molded between 225°–230° C. and 4600-5000 psi (31,717-34,475 kPa) for 2 hours with a Carver Laboratory press, employing a silicone mold release agent. Thermogravimetric analysis of the cured black polymer in nitrogen showed 5% weight loss at 375° C. and 35.5% weight loss at 950° C. In air the polymer lost 5% weight at 420° C.

EXAMPLE 3

The brown powder prepared in Example 1 was dried under full vacuum between 82°–129° C. for 9 hours 37 minutes (34,620 s). The dried brown powder softened between 200°–213° C. and melted at 272° C. This brown prepolymer (70 g) was dissolved in 1-methyl-2-pyrrolidinone (70.5 g) by heating to a slight boil on a hot plate. The 1-methyl-2-pyrrolidinone solution of 2-methyl-5-vinylpyridine terminated prepolymer was brushed onto a 14"×14" (35.6×35.6 cm) woven graphite fiber mat (Hercules AP193 dry cloth) clamped to a frame. The graphite fiber mat preimpregnate was allowed to dry overnight at room temperature. Then it was dried in an oven under full vacuum between 122°–183° C. for 44 minutes (2640 s). The dark brown prepolymer scraped off the graphite fiber mat preimpregnate soften between 216°–231° C. Nine 4"×4" (10.1×10.1 cm) sections were cut from the graphite fiber mat preimpregnate, layed up on top of one another and then compression molded between 190°–243° C. and 2050-2560 psi (14,135–17,651 kPa) for 3 hours 4 minutes (11,040 s) with a Carver Laboratory press. The finished composite had thoroughly fused giving a black rigid sample after trimming. Thermogravimetric analysis of the graphite composite in nitrogen showed 5% weight loss at 458° C. and 20.1% weight loss at 950° C. The composite lost 5% weight at 418° C. and 70% weight at 700° C. in air. Dynamic mechanical analyses was performed between −160° C. to 400° C. in the torsional rectangular mode with a oscillatory frequency of 1 hertz and 0.05% strain. The composite exhibited no glass transition temperature up to 400° C., a gamma transition ($T_\gamma$) temperature at −45° C. and storage modulus (G') of $5.713 \times 10^9$ dynes/cm² at 25° C. Modulus retention at 200° and 300° C. with respect to the storage modulus at 25° C. was 87 and 76%, respectively.

EXAMPLE 4

Technochemie Compimide H-795 was dried in an oven under full vacuum between 100°-137° C. for 1 hour and 8 minutes (4080 s). The 2-methyl-5-vinylpyridine terminated prepolymer prepared in Example 1 was dried under full vacuum between 66°-129° C. for 10 hours and 34 minutes (38,040 s). The resulting 2-methyl-5-vinylpyridine terminated prepolymer softened between 197°-222° C. and melted between 256°-277° C. The dried Technochemie Compimide H-795 (23.4 g) and dried 2-methyl-5-vinylpyridine terminated prepolymer (23.6 g) were mixed and ground with mortar and pestle giving a brown powder. In a differential scanning calorimetry analysis, the brown powder exhibited a bimodal exotherm of 173 joules/gram that started at 88° C., peaked at 135° C., ended at 168° C., peaked at 215° C. and ended at 280° C. The dried Technochemie Compimide H-795 alone exhibited a exotherm of 266 joules/gram that started at 120° C., peaked at 248° C. and ended at 340° C. This differential scanning calorimetry experiment demonstrates that the 2-methyl-5-vinylpyridine terminated prepolymer lowered the cure temperature of the Technochemic Compimide H-795 by at least 34° C.

The mixture (36.2 g) of Technochemie Compimide H-795 and 2-methyl-5-vinylpyridine terminated prepolymer was dissolved in 1-methyl-2-pyrrolidinone by heating to a slight boil on a hot plate. This 1-methyl-2-pyrrolidinone solution was brushed onto a 14"×14" (35.6×35.6 cm) woven graphite fiber mat (Hercules AP193 dry cloth) clamped to a frame. The graphite fiber mat preimpregnate was allowed to dry overnight at room temperature. Then it was dried in an oven under full vacuum between 164°-177° C. for 17 minutes (1020 s). The cooled graphite preimpregnate was rigid, shiny and dark brown. The copolymer was scrapped off and crushed with mortar and pestle to give a red brown powder which softened between 258°-287° C. Nine 4"×4" (10.1×10.1 cm) sections were cut from the graphite fiber mat preimpregnate, layed up on top of one another and then compression molded between 232°-277° C. and 2180-3020 psi (15,031-20,822 kPa) for 2 hours and 57 minutes (10,620 s) with a Carver Laboratory press. The finished composite had thoroughly fused giving a black rigid sample after trimming. Thermogravimetric analysis of the graphite composite in nitrogen showed 5% weight loss at 482° C. and 24% weight loss at 950° C. The composite lost 5% weight at 422° C. in air. Dynamic mechanical analysis showed no glass transition temperature up to 400° C., a gamma transition ($T_\gamma$) temperature at $-106°$ C. and storage modulus (G') of $5.06 \times 10^{10}$ dynes/cm² at 25° C. Modulus retention at 200° and 300° C. with respect to the storage modulus at 25° C. was 87 and 71%, respectively.

EXAMPLE 5

The mixture (9.22 g) of dried Technochemie Compimide H-795 and dried 2-methyl-5-vinylpyridine terminated prepolymer prepared in Example 4 was cured in an oven under full vacuum between 109°-195° C. for 20 minutes (1200 s). The resultant brown solid was ground with a mortar and pestle and then sieved with a U.S.A. Testing Sieve No. 40 to give a brown powder which softened between 211°-225° C. The powder was compression molded between 203°-273° C. and 7250-7900 psi (49,989-54,470 kPa) for 2 hours (7200 s) with a Carver Laboratory press. Thermogravimetric analysis of the cured copolymer in nitrogen showed 5% weight loss at 385° C. and 48.5% weight loss at 950° C. In air, the copolymer lost 5% weight at 385° C. Dynamic mechanical analyses showed a gamma transition ($T_\gamma$) temperature at $-97°$ C. and storage modulus (G') of $1.55 \times 10^{10}$ dynes/cm² at 25° C.

EXAMPLE 6

The 2-methyl-5-vinylpyridine terminated prepolymer prepared in Example 1 was dried under full vacuum between 66°-129° C. for 10 hours and 34 minutes (38,040 s). The dried 2-methyl-5-vinylpyridine terminated prepolymer (48.7 g) was mixed with 1,1'-(methylene-di-4,1-phenylene)bismaleimide (48.8 g) and then ground together with mortar and pestle to give a light brown powder. In a differential scanning calorimetry analysis, the light brown powder exhibited an exotherm of 111 joules/gram that started at 175° C., peaked at 207° C. and ended at 230° C. The 1,1'-(methylenedi-4,1-phenylene)bismaleimide alone exhibited an exotherm of 166 joules/gram that started at 180° C., peaked at 223° C. and ended at 270° C. This differential scanning calorimetry experiment demonstrates that the 2-methyl-5-vinylpyridine terminated prepolymer lowered the cure temperature of the 1,1'-(methylenedi-4,1-phenylene)bismaleimide by 16° C.

The light brown mixture (90.3 g) of dried 2-methyl-5-vinylpyridine terminated prepolymer and 1,1'-(methylenedi-4,1-phenylene)bismaleimide was partially cured in an oven under full vacuum between 115°-197° C. for 44 minutes (2640 s). The resulting dark brown fused solid was ground with mortar and pestle and sieved with a U.S.A. Testing Sieve No. 40 to give a brown powder which softened between 164°-210° C. The powder was compression molded between 197°-222° C. and 7450-8000 psi (51,368-55,160 kPa) for 55 minutes (3300 s) and then between 234°-273° C. and 7500-7530 psi (51,713-51,919 kPa) for 1 hour and 3 minutes (3780 s) with a Carver Laboratory press. Thermogravimetric analysis of the cured copolymer in nitrogen showed 5% weight loss at 395° C. and 57.5% weight loss at 950° C. In air, the copolymer lost 5% weight at 402° C. Dynamic mechanical analyses showed no glass transition temperature up to 400° C., a gamma transition ($T_\gamma$) temperature at $-103°$ C. and storage modulus (G') of $1.50 \times 10^{10}$ dynes/cm² at 25° C.

EXAMPLE 7

2,3,5,6-Tetramethylpyrazine (82.8 g, 0.61 mole), pyromellitic dianhydride (66.5 g, 0.3 mole) and acetic acid (74.1 g, 1.23 mole) were weighed into a 1 liter resin kettle equipped with an immersion thermometer, mechanical stirrer, nitrogen gas purge and condenser. After the reactants were stirred and deoxygenated for five minutes (300 s), acetic anhydride (127.6 g, 1.25 mole) was added to the resin kettle. The reactants were heated between 131°-141° C. for 52 minutes (3120 s) and then cooled to less than 100° C. Cis-5-norbornene-endo-2,3-dicarboxylic anhydride (100.9 g, 0.61 mole) was added to the resin kettle. The reactor contents were heated between 106°-143° C. for 10 hours and 7 minutes (36,420 s) and then cooled to room temperature to give a black viscous liquid. The black viscous liquid was dried in an oven under full vacuum between 75°-167° C.

for 7 hours and 14 minutes (26,040 s) to give a black soft solid. The black soft solid was added to tetrahydrofuran (500 ml) and the tetrahydrofuran removed by rotary evaporation under full vacuum at 100° C.

EXAMPLE 8

The cis-5-norbornene-endo-2,3-dicarboxylic anhydride terminated prepolymer prepared in Example 7 was placed into an oven under full vacuum between 56°–129° C. for 4 hours 52 minutes (17,520 s). The dried prepolymer softens at 66° C. and melts at less than 94° C. In a differential scanning calorimetry analysis, the cis-5-norbornene-endo-2,3-dicarboxylic anhydride terminated prepolymer exhibited an exotherm of 182.25 joules/gram that started at 180° C., peaked at 265° C. and ended at 310° C. The exotherm was attributed to addition polymerization of the cis-5-norbornene-endo-2,3-dicarboxylic anhydride terminal groups of the prepolymer.

EXAMPLE 9

The cis-5-norbornene-endo-2,3-dicarboxylic anhydride terminated prepolymer prepared in Example 7 was placed into an oven under full vacuum between 76°–155° C. for 4 hours 28 minutes (16,080 s). The dried prepolymer (68.6 g) and acetonitrile (377 g) were stirred at room temperature for 1 hour 59 minutes (7140 s). The acetonitrile was removed by vacuum filtration. Then the cis-5-norbornene-endo-2,3-dicarboxylic anhydride terminated prepolymer was dried in an oven under full vacuum between 110°–123° C. for 22 hours and 7 minutes (79,620 s). The dried prepolymer softened between 303°–321° C.

EXAMPLE 10

The dried cis-5-norbornene-endo-2,3-dicarboxylic anhydride terminated prepolymer prepared in Example 9 was compression molded between 256°–287° C. and 5530–6100 psi (38,129–42,060 kPa) for 1 hour 58 minutes (7080 s) with a Carver Laboratory press. Thermogravimetric analysis of the cure, black, glassy and pliant polymer in nitrogen showed 5% weight loss at 382° C. and 33.8% weight loss at 950° C.

EXAMPLE 11

The dried cis-5-norbornene-endo-2,3-dicarboxylic anhydride terminated prepolymer (39.2 g) prepared in Example 9 was dissolved in 1-methyl-2-pyrrolidinone (50.4 g) by heating to a slight boil on a hot plate. The 1-methyl-2-pyrrolidinone solution of the cis-5-norbornene-endo-2,3-dicarboxylic anhydride terminated prepolymer was brushed onto a 14"×14" (35.6×35.6 cm) woven graphite fiber mat (Hercules AP193 dry cloth) clamped to a frame. The graphite fiber mat preimpregnate was allowed to dry overnight at room temperature. Then it was dried in an oven under full vacuum between 107°–125° C. for 25 minutes (1500 s). The black prepolymer scrapped off the graphite fiber mat preimpregnate softened between 175°–191° C. Nine 4"×4" (10.1×10.1 cm) sections were cut from the graphite fiber mat preimpregnate, layed up on top of one another and then compression molded between 214°–262° C. and 270–1250 psi (1862–8619 kPa) for 3 hours (10,800 s) with a Carver Laboratory press. The finished composite had thoroughly fused giving a black rigid sample after trimming. Thermogravimetric analysis of the graphite composite in nitrogen showed 5% weight loss at 525° C. and 25.4% weight loss at 950° C. The composite lost 5% weight at 358° C. in air. Dynamic mechanical analysis showed no glass transition temperature up to 400° C., a gamma transition ($T_\gamma$) temperature at −82° C. and storage modulus (G') of $2.80 \times 10^{10}$ dynes/cm² at 25° C. Modulus retention at 200° and 300° C. with respect to the storage modulus at 25° C. was 91 and 84%, respectively.

EXAMPLE 12

2,4,6-Trimethylpyridine (432.9 g, 3.57 mole) and phthalic anhydride (446.4 g, 3.01 moles) were weighed into a 2 liter resin kettle equipped with an immersion thermometer, mechanical stirrer, nitrogen gas purge and condenser. Sulfuric acid (8.1 g, 0.083 mole) was added after complete dissolution which was apparent at 108° C. The temperature was maintained between 140°–183° C. for 6 hours 18 minutes (22,680 s). The reactor contents were cooled to room temperature giving a brown hard solid. The solid was crushed with mortar and pestle giving a light brown powder. The light brown powder (254 g) and acetic acid (122.3 g, 2.04 mole) were weighed into another 2 liter resin equipped with an immersion thermometer, mechanical stirrer, nitrogen gas purge and condenser. After the reactants were stirred and deoxygenated for five minutes (300 s), acetic anhydride (205.7 g, 2.01 mole) was added to the resin kettle. The reactants were maintained between 132°–145° C. for 3 hours 30 minutes (12,600 s). Then the reactor contents were cooled to 86° C. and 2-methyl-5-vinylpyridine (81.4 g, 0.68 mole) was added to the resin kettle. The reactor contents were heated between 114°–130° C. for an additional 25 hours 11 minutes (90,660 s) and then cooled to room temperature. The resultant black slurry was rotary evaporated under full vacuum at 100° C. and then dried under full vacuum in an oven between 80°–132° C. for 8 hours 27 minutes (30,420 s) giving a soft black 2-methyl-5-vinylpyridine terminated prepolymer.

EXAMPLE 13

Technochemie Compimide H-795 was dried in an oven under full vacuum at 130° C. for 1 hour (3600 s). The 2-methyl-5-vinylpyridine terminated prepolymer prepared in Example 12 (12.5 g) and the oven dried Technochemie Compimide H-795 (12.5 g) were mixed and ground to a fine black powder with mortar and pestle. This mixture was partially cured in an oven under full vacuum between 70°–215° C. for 1 hour and 1 minute (3660 s). The resulting black fused solid was ground with mortar and pestle and sieved with a U.S.A. Testing Sieve No. 40 to give a dark brown powder which softens between 178°–205° C. The powder was compression molded between 187°–205° C. and 5320–6000 psi (36,681–41,370 kPa) for 1 hour (3600 s) and then between 243°–277° C. and 5350–5380 psi (36,888–37,095 kPa) for another hour (3600 s) with a Carver Laboratory press. Thermogravimetric analysis of the black cured polymer in nitrogen showed 5% weight loss at 309° C. and 65.2% weight loss at 950° C. In air, the polymer lost 5% weight at 305° C.

I claim:

1. A thermosettable polymer or prepolymer prepared by reacting (A) at least one aromatic heterocyclic material having one or more rings with at least one nitrogen atom in at least one of such rings and at least two reactive substituent groups which have at least one reactive hydrogen atom attached to a carbon atom which is attached to a heterocyclic ring;

(B) at least one cycloaliphatic or aromatic carboxylic acid cyclic mono- or dianhydride; and (C) at least one material containing a polymerizable ethylenically unsaturated group and at least one group selected from (1) at least one aromatic heterocyclic material having one or more rings with at least one nitrogen atom in at least one of such rings and at least one substituent group which has at least one reactive hydrogen atom attached to a carbon atom which is attached to a heterocyclic ring;

(2) at least one cycloaliphatic or aromatic carboxylic acid cyclic monoanhydride or dianhydride group; or (3) a combination of any of such material; and wherein the components are employed in a molar ratio of (A):(B):(C) of from about 1:0.25:0.25 to about 1:4:4, respectively.

2. A polymer or prepolymer of claim 1 wherein (a) in component (A) the heterocyclic moiety is a pyrazine or pyridine moiety;

(b) component (B) is represented by the formula

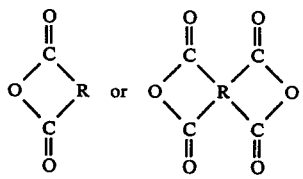

wherein R is a cycloaliphatic or aromatic group;

(c) component (C) is (1) a heterocyclic material wherein the heterocyclic moiety is a pyridine moiety or (2) a cyclic carboxylic acid monoanhydride represented by the formula

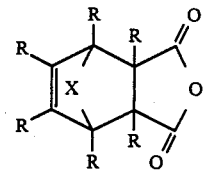

in which R is a hydrogen, halogen or a 1 to 4 carboxy alkyl group and X is either —CH$_2$—, —CH$_2$CH$_2$—, —O—, —NH—, —CCl$_2$— or —S—; and (d) components (A), (B) and (C) are employed in a molar ratio of from about 1:0.25:0.25 to about 1:4:4, respectively.

3. A polymer or prepolymer of claim 2 wherein components (A), (B) and (C) are employed in a molar ratio of from about 1:0.5:0.5 to about 1:1.5:1.5, respectively.

4. A polymer or prepolymer of claim 3 wherein (a) component (A) is 2,3,5,6-tetramethylpyrazine, 2,4,6-trimethylpyridine, or combination thereof;

(b) component (B) is pyromellitic dianhydride, phthalic anhydride, or combination thereof; and (c) component (C) is 2-methyl-5-vinylpyridine, cis-5-norbornene-endo-2,3-dicarboxylic anhydride, or combination thereof.

5. A cured product resulting from subjecting the polymer or prepolymer of claim 1, 2, 3 or 4 to conditions suitable for curing said polymer or copolymer.

6. A cured product of claim 5 wherein said curing is accomplished by heat and pressure.

7. A cured product of claim 6 wherein said curing is effected by compression molding at a temperature of from about 100° to about 350° C. and a pressure of up to about 100,000 psig.

8. A cured product of claim 5 wherein said curing is accomplished by reaction with a N,N'-bis-imide.

9. A cured product of claim 8 wherein said N,N'-bis-imide is 1,1'-(methylenedi-4,1-phenylene)bismaleimide, or combination thereof.

10. A cured product of claim 5 which contains a reinforcing material.

11. A cured product of claim 6 which contains a reinforcing material.

12. A cured product of claim 7 which contains a reinforcing material.

13. A cured product of claim 8 which contains a reinforcing material.

14. A cured product of claim 9 which contains a reinforcing material.

* * * * *